United States Patent [19]

Sasamoto et al.

[11] Patent Number: 5,796,546
[45] Date of Patent: Aug. 18, 1998

[54] DISK APPARATUS FOR CONTROLLING A SEEK OPERATION OF A READ/WRITE HEAD TO A TARGET LOCATION OF A RECORDING DISK

[75] Inventors: Tatsuro Sasamoto; Hideyuki Watanabe, both of Kawasaki, Japan

[73] Assignee: Fujitsu Limited, Kawasaki, Japan

[21] Appl. No.: 661,592

[22] Filed: Jun. 11, 1996

[30] Foreign Application Priority Data

Nov. 13, 1995 [JP] Japan ................................ 7-294429

[51] Int. Cl.⁶ .............................................. G11B 5/516
[52] U.S. Cl. ............................ 360/78.04; 360/78.08; 360/77.04
[58] Field of Search ........................ 360/78.08, 78.04, 360/77.04, 78.09, 78.11, 78.14, 77.02, 31, 53, 75; 318/560, 561

[56] References Cited

U.S. PATENT DOCUMENTS

| | | | |
|---|---|---|---|
| 4,924,331 | 5/1990 | Robinson et al. | 360/72.1 |
| 5,084,789 | 1/1992 | Kamo et al. | 360/53 |
| 5,268,884 | 12/1993 | Kiuchi et al. | 360/78.04 |
| 5,271,018 | 12/1993 | Chan | 360/72.1 |
| 5,434,725 | 7/1995 | Hirose et al. | 360/77.04 |

FOREIGN PATENT DOCUMENTS

| | | |
|---|---|---|
| 63-26814 | 2/1988 | Japan. |
| 63-167488 | 7/1988 | Japan. |
| 63-237270 | 10/1988 | Japan. |
| 64-57465 | 3/1989 | Japan. |
| 59-63065 | 4/1994 | Japan. |

*Primary Examiner*—Tan Dinh
*Attorney, Agent, or Firm*—Greer, Burns & Crain, Ltd.

[57] ABSTRACT

A disk apparatus in which a seek operation of one of a plurality of heads to a target position on one of a plurality of recording disks is performed by using location data on the one of the recording disks, includes a memory unit in which at least defect location data is stored, the defect location data indicating a location of a defect on the recording disks. A defect location determining unit determines a seek path of one of the heads from a present position to the target position prior to performing the seek operation, and detects whether the defect location is included in the seek path. A seek control unit performs the seek operation of the one of the heads by using the location data on the one of the recording disks, and inhibits using the location data at the defect location when the defect location determining unit detects that the defect location is included in the seek path.

14 Claims, 14 Drawing Sheets

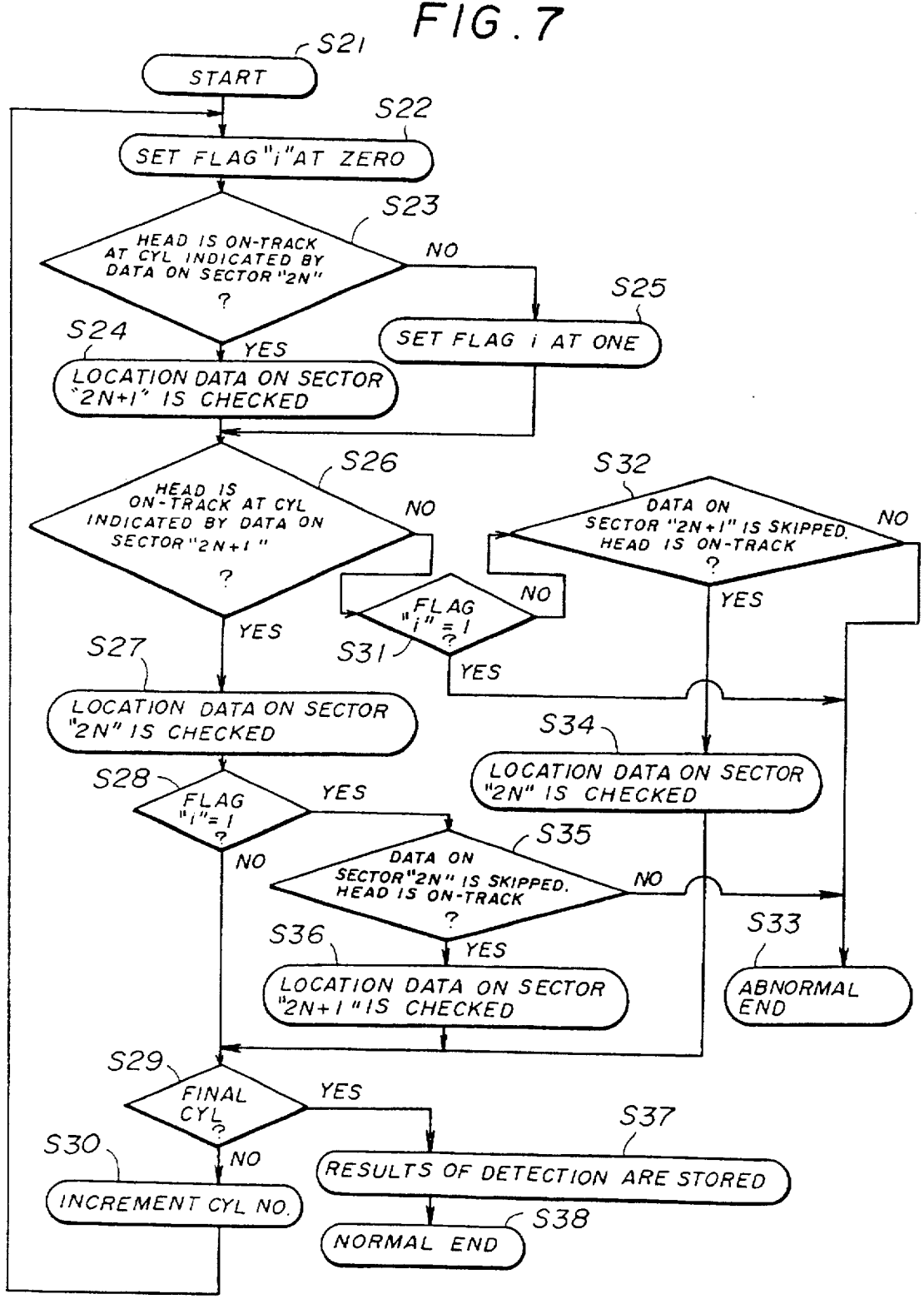

HEAD NO.   CYL NO.   SCT NO.

| SAMPLING POINT | CYL | SCT |
|---|---|---|
| 1 | 0.0 | 49 |
| 2 | 0.0 | 50 |
| 3 | 1.0 | 51 |
| 4 | 2.1 | 52 |
| 5 | 3.8 | 53 |
| 6 | 5.7 | 54 |
| ⋮ | | |
| 35 | 67.3 | 23 |
| 36 | 71.1 | 24 |
| 37 | 75.0 | 25 |
| 38 | 78.9 | 26 |
| 39 | 82.6 | 27 |
| ⋮ | | |
| 57 | 99.5 | 45 |
| 58 | 100.0 | 46 |
| 59 | 100.0 | 47 |
| 60 | 100.0 | 48 |

DISK APPARATUS FOR CONTROLLING A SEEK OPERATION OF A READ/WRITE HEAD TO A TARGET LOCATION OF A RECORDING DISK

BACKGROUND OF THE INVENTION

(1) Field of the Invention

The present invention relates to a disk apparatus in which a seek operation of one of read/write heads to a target location of one of recording disks is performed without causing a seek error to occur even when location data of the recording disks includes a defect.

High reliability of disk devices such as magnetic disk devices and low cost of recording disks used by the disk devices are demanded in recent years. In order to easily ensure high reliability, one has only to use a high-precision recording medium. The cost becomes high, however, when the high-precision recording medium is used. When a low-cost, low-precision recording medium is used, the reliability becomes low and several defects may be included in the recording disk. If location data on the recording medium includes a defect, a seek operation of a head cannot be performed by the disk device. It is desirable to perform a seek operation of a read/write head even when the location data on the recording disk includes a defect.

(2) Description of the Related Art

FIG. 1 shows a conventional magnetic disk apparatus 11. In the conventional disk apparatus 11, a plurality of magnetic heads 13 are provided to access data on one of a plurality of recording disks of a hard disk 12. For the sake of convenience, a single magnetic head 13 for a single recording disk of the hard disk 12 is shown in FIG. 1.

One of the magnetic heads 13 is selected by a head control integrated circuit (HCC) 14 to access data on the hard disk 12, and the operation of the selected magnetic head 13 to seek a selected location of the hard disk 12 is performed. The operation of the HCC 14 is controlled by a read channel control unit (RDC) 15. The RDC 15 includes an encoder and a decoder.

When data on the hard disk 12 is read by the selected magnetic head 13, the read data is decoded by the decoder of the RDC 15 so that the decoded data is output to a microprocessor unit (MCU) 16 via an analog-to-digital (A/D) converter 16. On the other hand, data from a hard disk controller (HDC) 18 is sent to the RDC 15, and the data is encoded by the encoder of the RDC 15. One of the magnetic heads 13 is selected by the HCC 14 so that the data is written to the selected location of the hard disk 12 by the selected magnetic head 13 under the control of the HCC 14.

A random access memory (RAM) 19 is connected to the HDC 18. A random access memory (RAM) 20 and a read-only memory (ROM) 21 are connected to the MCU 17. A program to be executed by the MCU 17 is stored in the ROM 21, and the RAM 20 is used by the MCU 17 to execute the program.

Control signals from the MCU 17 are supplied to a spindle motor (SPM) 22 and a voice coil motor (VCM) 23 via an analog-to-digital (A/D) converter 24 and a servo driver (SRVDRV) 25. The hard disk 12 is rotated at a predetermined rotation speed by the SPM 22. One of the magnetic heads 13 is moved in a radial direction of the recording disks of the hard disk 12 by the VCM 23 to perform the seek operation of the magnetic head 13. The operations of the SPM 22 and the VCM 23 are driven and controlled by the SRVDRV 25.

The RDC 15 outputs a read/write gate signal to the HCC 14 so that the read/write operation of the magnetic head 13 is performed in accordance with the read/write gate signal. In order to carry out the read/write operation of the magnetic head 13 to accurately read or write data on the hard disk 12, it is necessary for the conventional disk apparatus to read out, prior to performing the read/write operation, location data which is stored on the hard disk 12 at a data portion of each sector or at a servo frame portion of each sector.

However, in the conventional disk apparatus, if the location data of the hard disk 12 includes a defect, a seek error occurs during the seek operation of the magnetic head to access data on the hard disk 12. It is impossible to carry out the read/write operation of the magnetic head 13 (which includes the seek operation and the follow-up operation of the magnetic head 13 to a target location of the hard disk 12) when the seek error has occurred. In such a case, the re-formatting of the hard disk 12 will be required, and the stored data of the hard disk 12 will be damaged. There is a problem in that the cost needed for the re-formatting of the hard disk and the re-preparation of the stored data in the conventional disk apparatus becomes high if the seek error occurs.

SUMMARY OF THE INVENTION

An object of the present invention is to provide an improved disk apparatus in which the above-described problems are eliminated.

Another object of the present invention is to provide a disk apparatus which reliably and efficiently controls a seek operation of a read/write head to a target location of a recording disk without causing a seek error to occur even when location data of the recording disk includes a defect.

Still another object of the present invention is to provide a disk apparatus which ensures with a low cost a reliable seek operation of the read/write head when the location data of the recording disk includes a defect.

The above-mentioned objects of the present invention are achieved by a disk apparatus in which a seek operation of one of a plurality of heads to a target position on one of a plurality of recording disks is performed by using location data on the one of the recording disks, the disk apparatus including: a memory unit in which at least defect location data is stored, the defect location data indicating a location of a defect on the recording disks; a defect location determining unit determining a seek path of one of the heads from a present position to the target position prior to performing the seek operation, and detecting whether the defect location, indicated by the defect location data read from the memory unit, is included in the seek path; and a seek control unit performing the seek operation of the one of the heads by using the location data on the one of the recording disks, and inhibiting using the location data at the defect location when the defect location determining unit detects that the defect location is included in the seek path.

According to the present invention, it is possible to control the seek operation of the read/write head without causing a seek error to occur when the location data of the hard disk includes a defect. Since it is not necessary to provide an additional control circuit for the disk apparatus, the method and apparatus of the present invention can provide the above-mentioned control of the seek operation with a low cost. Also, it is not necessary to use a high-precision recording medium for the disk apparatus, and it is possible to ensure high reliability of the seek operation of the read/write head with a low cast.

BRIEF DESCRIPTION OF THE DRAWINGS

Other objects, features and advantages of the present invention will become more apparent from the following detailed description when read in conjunction with the accompanying drawings in which:

FIG. 7 is a flowchart for explaining a defect-location detecting procedure which is performed in another embodiment of the present invention;

DETAILED DESCRIPTION OF THE PREFERRED EMBODIMENTS

A description will now be given of the preferred embodiments of the present invention with reference to the accompanying drawings.

Figure 1:
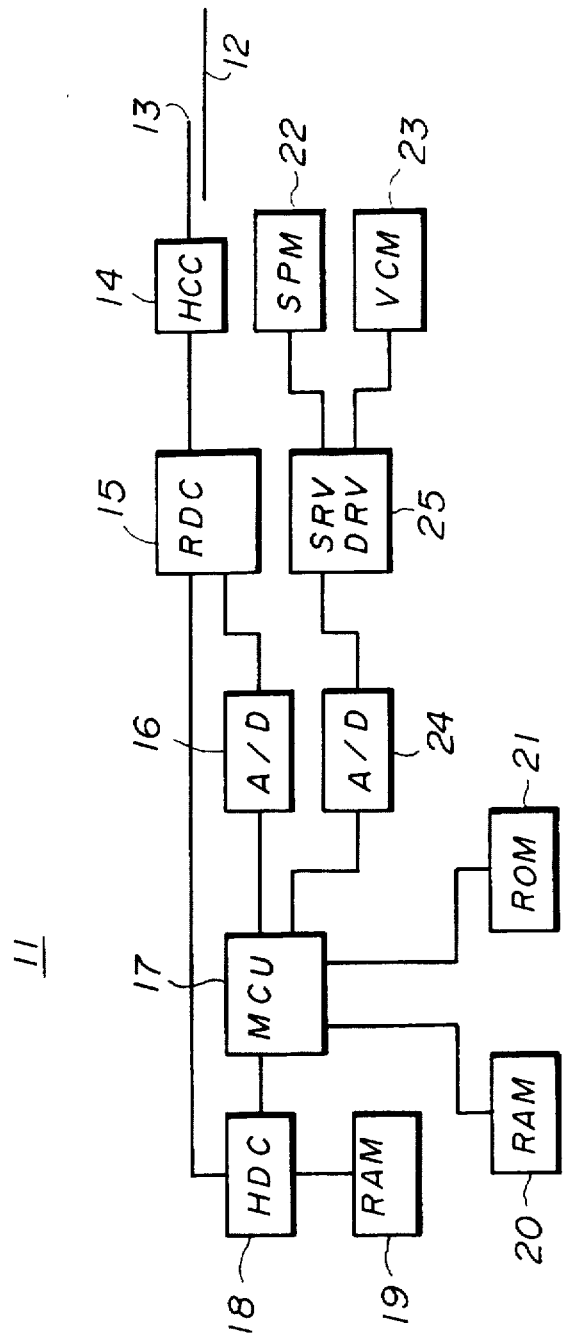
FIG. 1 is a block diagram of a conventional disk apparatus.
Figure 2:
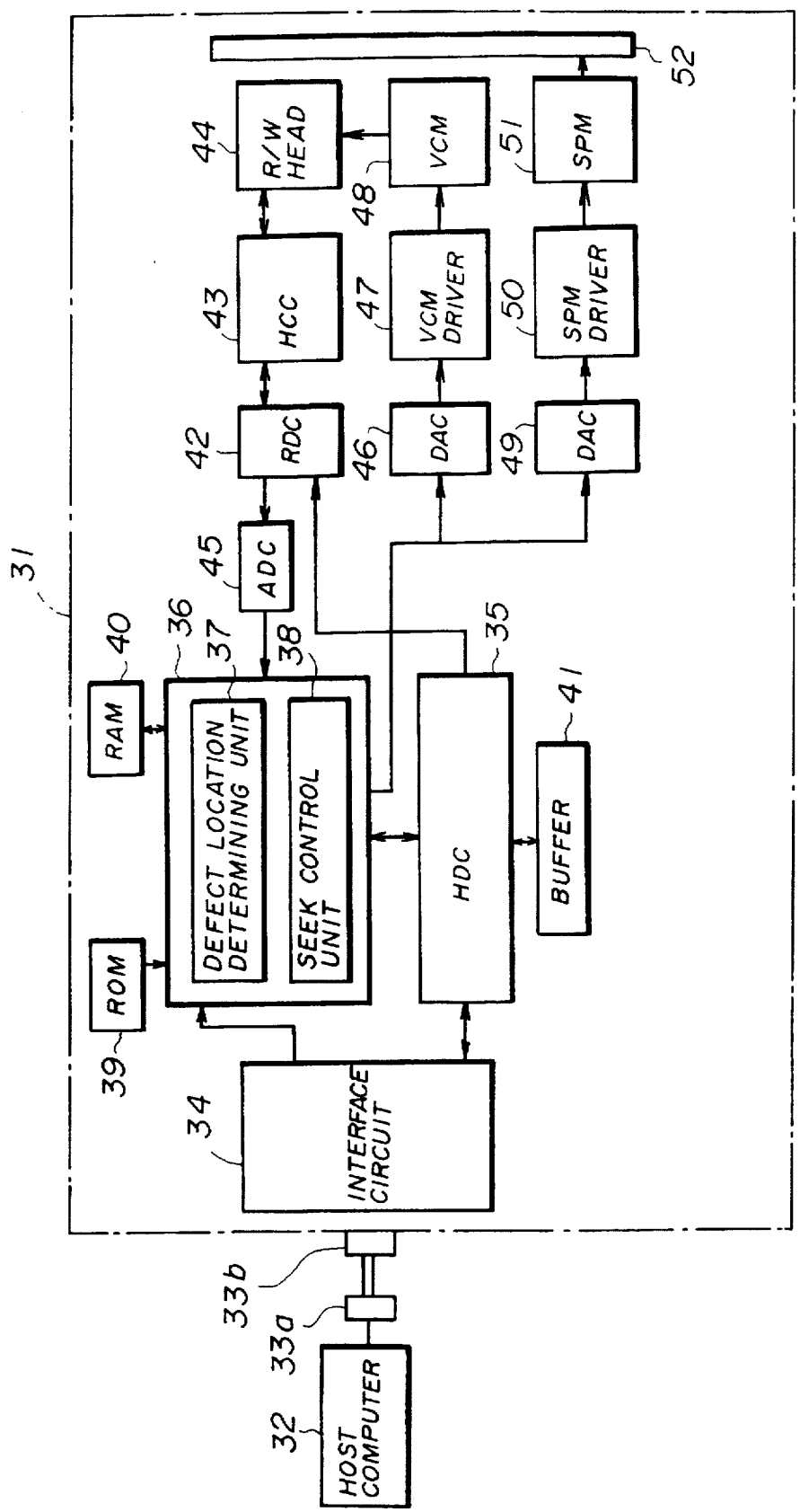
FIG. 2 is a block diagram of a magnetic disk apparatus in one embodiment of the present invention.

FIG. 2 shows a magnetic disk apparatus 31 in one embodiment of the present invention. The magnetic disk apparatus 31 is connected to a host computer 32 via interface devices 33a and 33b. The interface devices 33a and 33b are, for example, SCSI (small computer systems interface) devices. The SCSI is one of the known interface standards for passing data between a hard disk and a computer.

The disk apparatus 31 includes an interface circuit 34, a hard disk controller (HDC) 35 and a microprocessor unit (MPU) 36. The HDC 35 is connected to the interface circuit 34, and the MPU 36 is connected to the interface circuit 34.

The MPU 36 includes a defect location determining unit 37 and a seek control unit 38, which will be described later. Operations of the defect location determining unit 37 and the seek control unit 38 are carried out by using computer programs stored in a memory of the MPU 36.

The defect location determining unit 37 determines a seek path of one of a plurality of read/write heads 44 from its present position to its target position on a hard disk 52, and detects whether a location of a defect, indicated by stored defect location data, is included in the seek path on the hard disk 52.

The seek control unit 38 performs a seek operation of the one of the read/write heads 44 in accordance with location data read from the hard disk 52, and inhibits using the location data at the location of the defect on the hard disk 52 when it is detected that the defect location is included in the seek path.

The MPU 36 is provided with a read-only memory (ROM) 39 and a random access memory (RAM) 40 which are connected to the MPU 36. The ROM 39 is a memory unit in which all location data including the defect location data (or the defect location data only) is stored. Programs for carrying out the above operations of the defect location determining unit 37 and the seek control unit 38 are stored in the ROM 39. The RAM 40 is used by the MPU 36 as the working area. A read command, a write command, or any other command from the host computer 32 is input to the MPU 36 via the interface circuit 34.

The HDC 35 is provided with a buffer 41 connected thereto. User data which is input to the HDC 35 is temporarily stored in the buffer 41. When a write gate signal from the MPU 36 is input to the HDC 35, the stored user data is read from the buffer 41 at the time of writing the data to the hard disk 52, and the user data is output to the read channel (RDC) 42. The user data from the RDC 42 is supplied to one of the R/W heads 44 via a head control integrated circuit (HCC) 43.

The RDC 42 includes an encoder and a decoder. The data from the HDC 35 is supplied to the encoder of the RDC 42 so that the encoded data from the encoder is output. A data signal read by one of the R/W heads 44 from the hard disk 52 is supplied to the decoder of the RDC 42, and the data which is decoded by the decoder is supplied to the MPU 36 via an analog-digital converter (ADC) 45.

A seek control signal from the seek control unit 38 of the MPU 36 is supplied to a VCM driver 47 via a digital-analog converter (DAC) 46. A voice coil motor (VCM) 48 is controlled by the VCM driver 47 in accordance with the seek control signal. A seek operation of the R/W heads 44 is performed by the VCM 48 by moving the R/W heads 44 in a radial direction of the platter of the hard disk 52.

A rotation control signal from the MPU 36 is supplied to a SPM driver 50 via a digital-analog converter (DAC) 49. A spindle motor (SPM) 51 is controlled by the SPM driver 50 in accordance with the rotation control signal. A rotating operation of the hard disk 52 (which includes a number of magnetic disks) on the spindle of the SPM 51 at a predetermined rotation speed is carried out by the SPM driver 50.

The hard disk 52 includes a plurality of magnetic disks. Each magnetic disk of the hard disk 52 in the present embodiment requires two read/write heads of the R/W heads 44, one for each side. All the R/W heads 44 are attached to an access arm 63 so that the R/W heads 44 cannot move independently.

Figure 3:
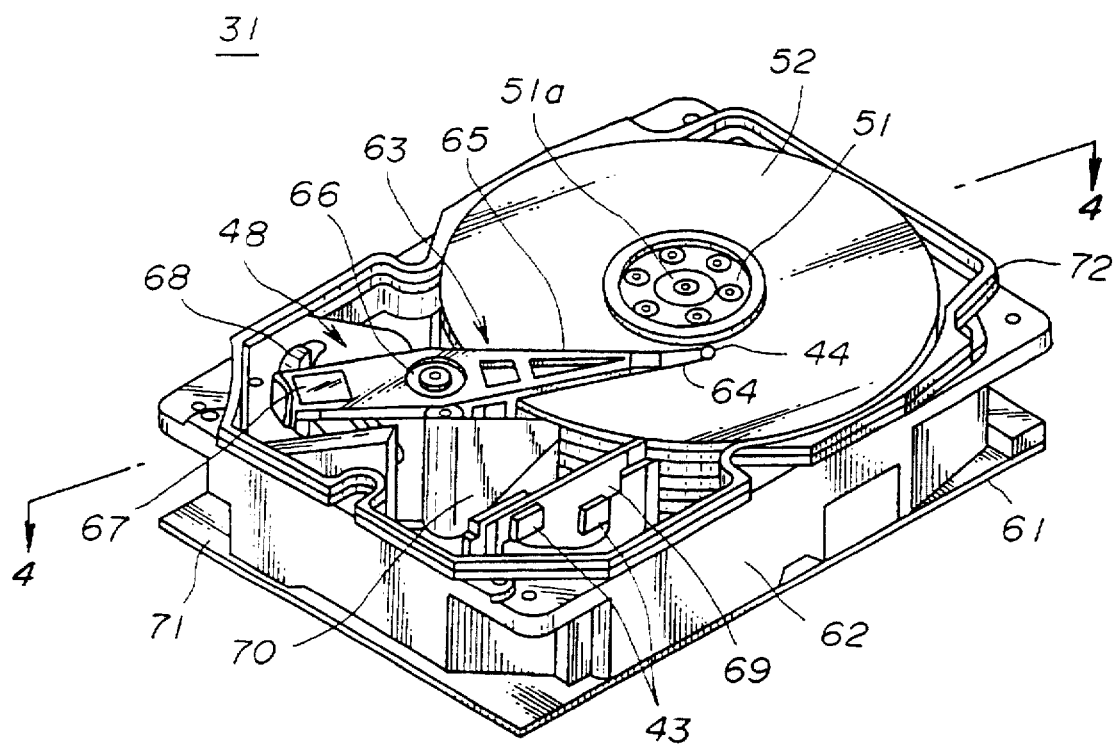
FIG. 3 is a perspective view of the construction of the disk apparatus in FIG. 2.
Figure 4:
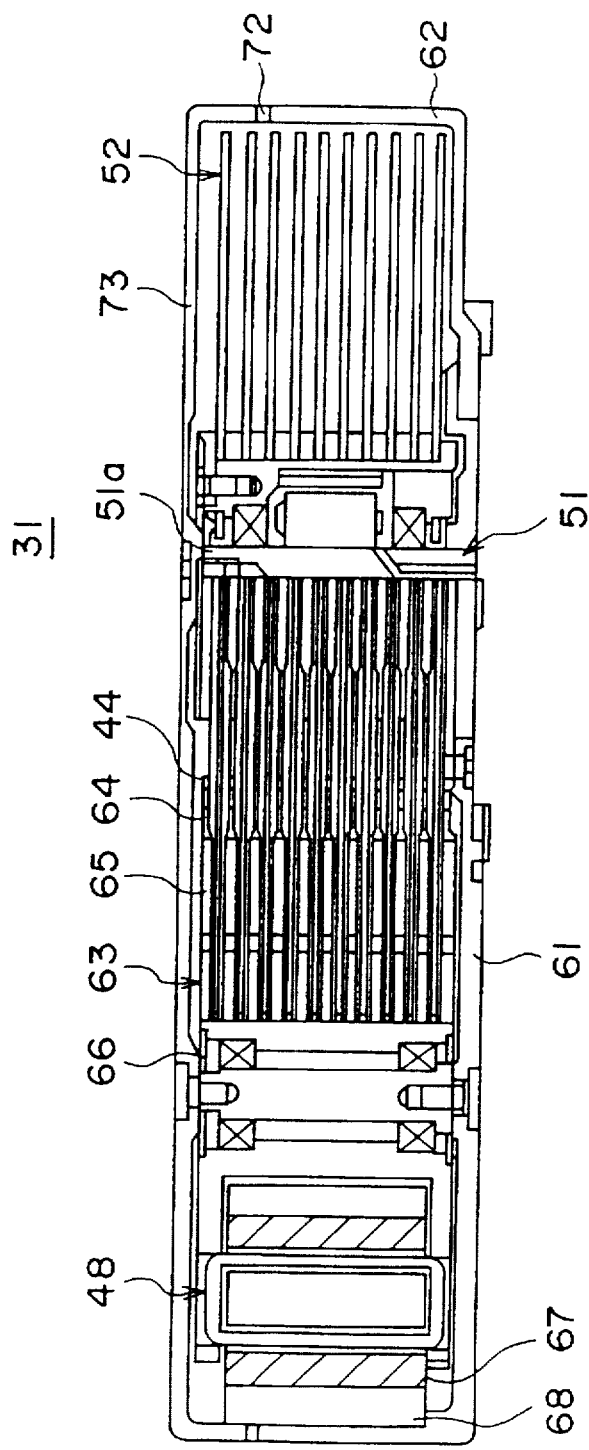
FIG. 4 is a cross-sectional view of the disk apparatus taken along a line A—A indicated in FIG. 3.

FIG. 3 shows the construction of the disk apparatus of the present embodiment within its external cover. FIG. 4 is a cross-sectional view of the disk apparatus taken along a line A—A indicated in FIG. 3.

As shown in FIGS. 3 and 4, the disk apparatus 31 has a base 61 on which an enclosure 62 is formed. The magnetic disks of the hard disk 52 are rotatably supported on a spindle 51a of the spindle motor (SPM) 51, and the hard disk 52 and the SPM 51 are arranged within the enclosure 62.

The access arm 63 is provided with a number of arms 65 to which the read/write (R/W) heads 44 are attached, each R/W head 44 attached to the leading edge of one of the arms 65 via a supporting spring unit 65. The access arm 63 is rotatably supported on a rotating shaft 66. The VCM 48 includes a voice coil 67 and a magnet 68, and the VCM 48 is arranged within the enclosure 62 at the opposite end of the access arm 63 to the R/W heads 44 with respect to the rotating shaft 66.

A printed circuit board 69 on which the HCC 43 is packaged is connected to the VCM 48 via a flexible printed circuit (FPC) cable 70. The printed circuit board 69 is also connected to a main printed circuit board 71 via another flexible printed circuit (FPC) cable (not shown). The above MPU 62 is packaged on the main printed circuit board 71.

In the disk apparatus 31, as shown in FIG. 4, a cover 73 is mounted on the top of the enclosure 62 via a sealing member 72.

Figure 5A:
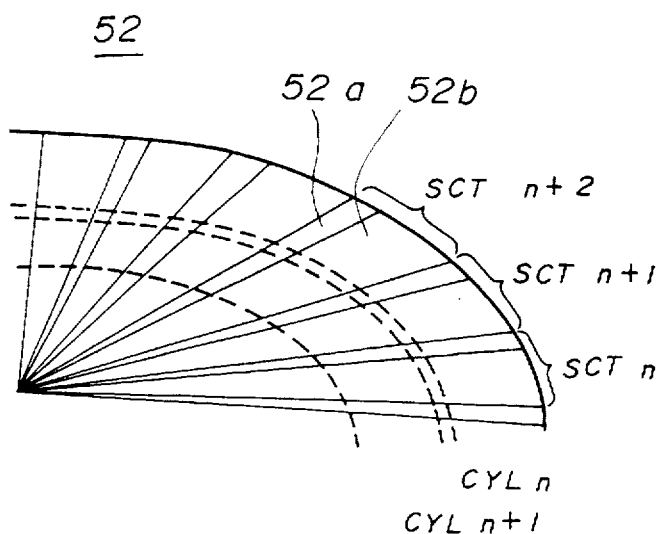
FIGS. 5A and 5B are diagrams for explaining a format of a hard disk used by the disk apparatus of the present embodiment.
Figure 5B:
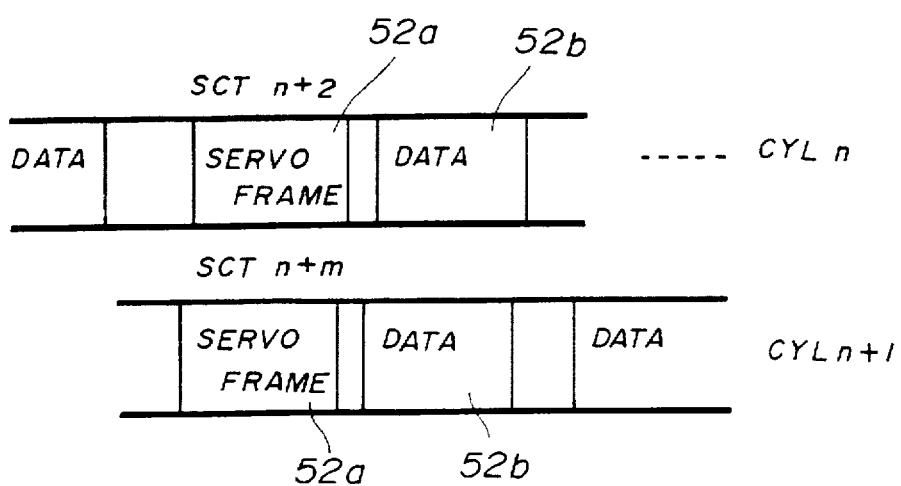

FIGS. 5A and 5B show a format of the hard disk 52 used by the disk apparatus of the present embodiment. A portion of the hard disk 52 is shown in FIG. 5A in order to explain the format of the hard disk 52.

Generally, the hard disk 52 is divided into tracks and sectors. The tracks are concentric circles around the central axis of the hard disk. The sectors are segments within each circle. The sectors include recording areas of the hard disk 52. As shown in FIG. 5A, each sector includes a servo frame portion 52a and a data portion 52b.

As described above, the hard disk 52 has a plurality of magnetic disks. Each magnetic disk requires two read/write heads, one for each side. All the read/write heads 44 are attached to the access arm 63 so that the heads cannot move independently. Each magnetic disk has the same number of tracks, and a track location that cuts across all the disks is called a cylinder. As shown in FIG. 5A, the hard disk 52 has a number of cylinders "CYL n".

As shown in FIG. 5B, each sector SCT of one of the cylinders CYL in the hard disk 52 has the servo frame portion 52a and the data portion 52b. Servo data needed for each servo control is pre-recorded in the servo frame portion 52a of each sector SCT. Cylinder address data needed for a seek operation of a head is pre-recorded in the servo frame portion 52a as the location data. User data from the user is written to the data portion 52b of each sector SCT.

In the disk apparatus 31 of the present embodiment, it is possible that, when placing one of the R/W heads 44 onto a track of a target cylinder of the hard disk 52, a seek operation of the R/W heads 44 is normally performed without causing a seek error to occur even when the location data on the hard disk 52 has an error due to a physical flaw on the hard disk 52 or the like. In order to carry out the seek operation as mentioned above, it is necessary to detect the location of the defect on the hard disk 52 prior to performing the seek operation.

Figure 6:
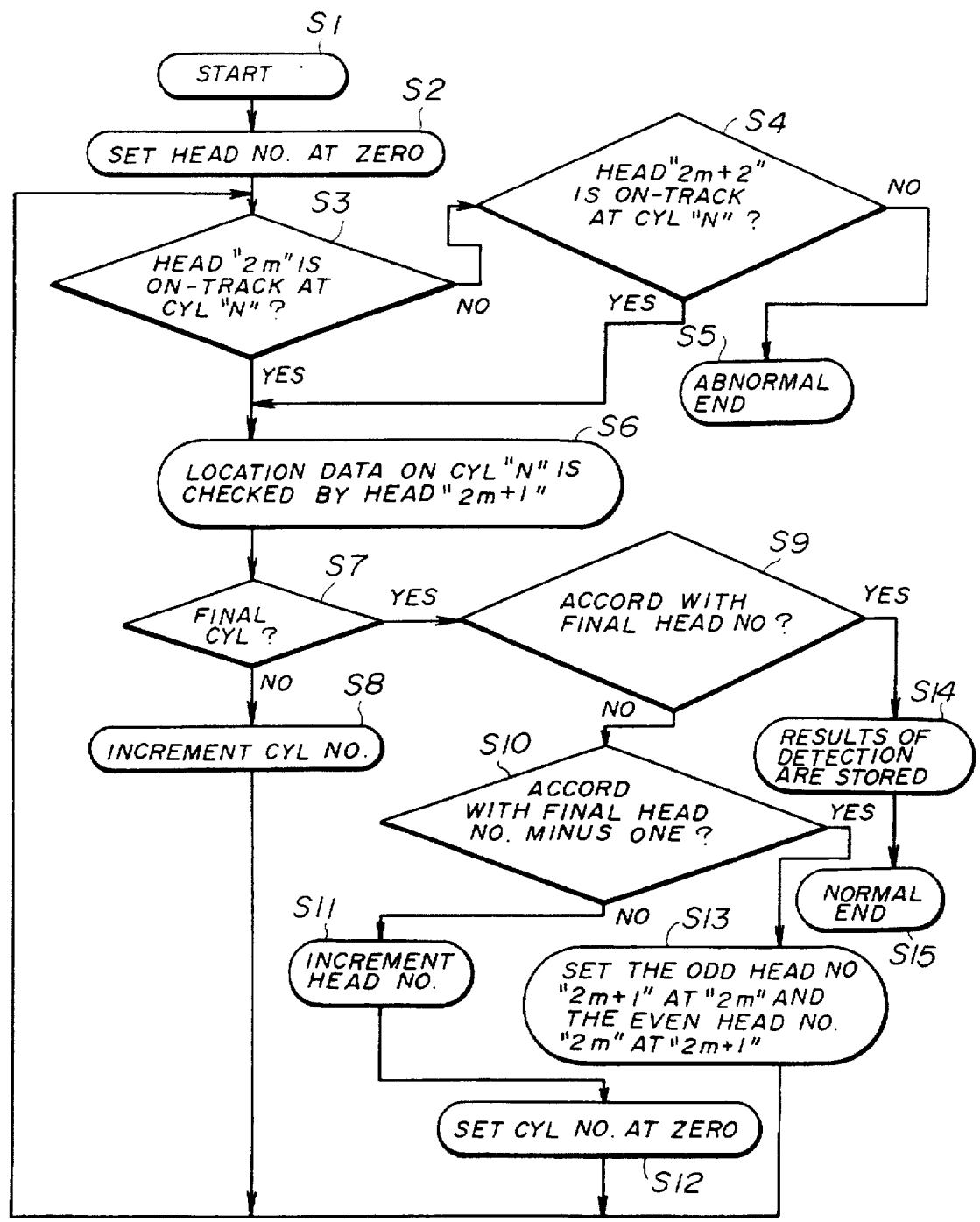
FIG. 6 is a flowchart for explaining a defect-location detecting procedure which is performed by the disk apparatus of the present embodiment.

FIG. 6 shows a defect-location detecting procedure which is performed by the MPU 36 in the present embodiment. The defect-location detecting procedure is a self-diagnostic test which is automatically done prior to performing a seek operation. The defect-location detecting procedure is, for example, executed by the MPU 36 in accordance with a defect-location detecting program stored in the ROM 39.

Referring to FIG. 6, step S1 starts the self-diagnostic test in which the defect-location detecting procedure is performed by the MPU 36.

Step S2 sets a head number at zero. In the defect-location detecting procedure, a value of the head number indicates a specific one of the R/W heads 44 in the disk apparatus 31. The head number will be subsequently incremented so as to indicate another one of the R/W heads 44 for a next cycle.

Here, it is supposed that the total number of the R/W heads 44 provided in the disk apparatus 31 is indicated by "2m" (where m=0, 1, 2, . . . ; "2m" indicates an even number; and "2m+1" indicates an odd number).

After the step S2 is performed, step S3 detects whether a R/W head 44 of the head number "2m" (which is a variable initially set at zero) is on-track at a selected cylinder "N" of the hard disk 52 when an on-track operation of the R/W head 44 of the head number "2m" is performed. The selected cylinder "N" is initially set at the outermost cylinder of the hard disk 52, and it is subsequently changed to a next inner cylinder, for all the cylinders of the hard disk 52.

When the result at the step S3 is negative, it is determined that the R/W head 44 of the even number "2m" is off-track at the cylinder "N", and step S4 is performed. Step S4 detects whether a R/W head 44 of another even number, which is different from the even number "2m" or the odd number "2m+1" (the other even number at this step is, for example, "2m+2"), is on-track at the cylinder "N" when an on-track operation of the above R/W head 44 of the other even number is performed.

When the result at the step S4 is negative, it is determined that the R/W head 44 of the other even number is off-track at the cylinder "N". The defect-location detecting procedure is finished as the abnormal end at step S5.

When the result at the step S3 is affirmative or when the result at the step S4 is affirmative, it is determined that either the R/W head 44 of the even number "2m" or the R/W head 44 of the other even number is on-track at the cylinder "N", and step S6 is performed. Step S6 reads the location data (the servo data) on all the sectors of the cylinder "N" of the hard disk 52 by using a R/W head 44 of the odd number "2m+1", and detects whether the error between a location indicated by the location data read from the hard disk 52 and the center of the on-track position of the above head 44 of the even number ("2m" or "2m+2") is smaller than a reference value. When the error is detected as being greater than the reference value, it is determined that the location indicated by the location data is a defect. The above-mentioned checking is carried out at the step S6 for each of the location data on all the sectors (all the servo frame portions 52a) of the cylinder "N" of the hard disk 52.

Step S7 detects whether the present cylinder "N" (which is accessed by the R/W head 44 of the odd number "2m+1") is the final cylinder of the hard disk 52. The final cylinder at this step S7 is the innermost cylinder of the hard disk 52 if the defect location detection is started from the outermost cylinder thereof. On the contrary, if the defect location detection is started from the innermost cylinder of the hard disk 52, the final cylinder at this step S7 is the outermost cylinder of the hard disk 52.

When the result at the step S7 is negative, step S8 is performed. Step S8 increments the cylinder number "N" (N=N+1). The above steps S3 through S6 are repeated until the defect location detection from the first cylinder to the final cylinder is completed (or the result at the step S7 becomes affirmative). The location of the defect on the corresponding magnetic disk of the hard disk 52 which is accessed by the R/W head 44 of the odd number "2m+1" is thus detected.

When the result at the step S7 is affirmative, it is determined that the defect location detection from the first cylinder to the final cylinder is completed, and step S9 is performed. Step S9 detects whether the present head number (which is the head number of the R/W head 44 used to access the final cylinder of the hard disk 52) accords with the final head number of the final one among all the R/W heads 44.

When the result at the step S9 is negative, it is determined that the R/W head 44 used to access the final cylinder of the hard disk 52 is not the final head among all the R/W heads 44, and step S10 is performed. Step S10 detects whether the present head number (which is the head number of the R/W head 44 used to access the final cylinder of the hard disk 52) accords with a head number derived by subtracting 1 from the final head number of the final one among all the R/W heads 44.

When the result at the step S10 is negative, it is determined that the R/W head 44 used to access the final cylinder of the hard disk 52 is not the final head. Step S11 increments the present head number. Step S12 sets the cylinder number at zero. The procedure is transferred to the above step S3, and the above steps S3 through S10 are repeated in the same manner as described above.

When the result at the step S10 is affirmative, the present head number accords with the head number derived by subtracting one from the final head number of the R/W heads 44. In this case, step S13 sets the odd head number "2m+1" at "2m" and the even head number "2m" at "2m+1". The procedure is transferred to the above step S3, and the above steps S3 through S12 are repeated in the same manner as described above.

When the result at the step S9 is affirmative, the present head number accords with the final head number of the R/W heads 44. It is determined that the defect-location detection for the location data of all the sectors on each cylinder of the hard disk 52 with respect to all the R/W heads 44 is completed. Step S14 stores all the results of the above defect-location detection in a memory. The results of the above detection include all the location data of the hard disk 52 containing the defect location data. Alternatively, the step S14 stores only the defect location data in the memory. After the step S14 is performed, the defect location detecting procedure is finished as the normal end at step S15.

FIG. 7 shows a defect-location detecting procedure which is performed in another embodiment of the present invention.

In the previous embodiment of FIG. 6, the on-track checking and defect-location detection is performed with regard to each of the R/W heads 44. In the present embodiment of FIG. 7, the on-track checking and defect location detection is performed with respect to each of the sectors of the hard disk 52.

Referring to FIG. 7, step S21 starts the self-diagnostic test in which the defect-location detecting procedure is performed by the MPU 36.

Step S22 sets a flag "i" at zero ("i"=0). Step S23 reads location data on a selected sector "2N" ("2N": an even number) of the hard disk 52, and detects whether a R/W head 44 (a selected one of the R/W heads 44) is on-track at a cylinder indicated by the location data of the sector "2N" when an on-track operation of the above R/W head 44 to locate the cylinder is performed.

When the result at the step S23 is affirmative, it is determined that the above R/W head 44 is on-track at the above cylinder of the hard disk 52, and step S24 is performed. Step S24 checks that the error between the on-track position of the R/W head 44 on a cylinder of the hard disk 52 at the sector "2N+1" ("2N+1": an odd number) and the center of the track of the above cylinder is smaller than a reference value. When the error is detected as being greater than the reference value, it is determined that the location indicated by the location data of the sector "2N" is a defect. Otherwise, the location indicated by the location data of the sector "2N" is determined as being correct.

When the result at the step S23 is negative, it is determined that the R/W head 44 is off-track at the cylinder indicated by the location data of the sector "2N", and step S25 is performed. Step S25 sets the flag "i" at one ("i"=1).

After the step S24 or the step S25 is performed, step S26 is performed. Step S26 reads location data on the sector "2N+1" of the hard disk 52, and detects whether the R/W head 44 is on-track at a cylinder indicated by the location data of the sector "2N+1" when an on-track operation of the above R/W head 44 is performed.

When the result at the step S26 is affirmative, it is determined that the R/W head 44 is on-track at the above cylinder of the hard disk 52, and step S27 is performed. Step S27 checks that the error between the on-track position of the R/W head 44 on the cylinder of the hard disk 52 at the sector "2N" and the center of the track of the above cylinder is smaller than the reference value. When the error is detected as being greater than the reference value, it is determined that the location indicated by the location data of the sector "2N+1" is defective. Otherwise the location indicated by the location data of the sector "2N+1" is determined as being correct.

After the step S27 is performed, step S28 detects whether the flag "i" is equal to the value "one". When the result at the step S28 is negative (i.e., "i"=0), step S29 is performed. Step S29 detects whether the present cylinder (which is accessed by the above R/W head 44) is the final cylinder of the hard disk 52.

When the result at the step S29 is negative, step S30 increments the cylinder number. The above steps S22 through S30 are repeated until the defect location detection from the first cylinder to the final cylinder is completed (or the result at the step S29 becomes affirmative). The location of the defect on the hard disk 52 which is accessed by the R/W head 44 is thus detected.

Further, when the result at the step S26 is negative, it is determined that the location indicated by the location data of the sector "2N+1" is defective, and the R/W head 44 is off-track at the above cylinder of the hard disk 52, and step S31 is performed. Step S31 detects whether the flag "i" is equal to the value "one".

When the flag "i" at the step S31 is not equal to the value "one" (i.e., "i"=0), step S32 is performed. Step S32 skips the location data on the sector "2N+1" of the hard disk 52, and detects whether the R/W head 44 is on-track at a cylinder indicated by the previous location data when an on-track operation of the R/W head 44 is performed.

When the flag "i" at the step S31 is equal to the value "one" (i.e., "i"=1) or when the result at the step S32 is negative, the above defect location detecting procedure is finished as the abnormal end at the step S33.

When the result at the above step S32 is affirmative, step S34 is performed. Step S34 checks that the error between the on-track position of the R/W head 44 on the cylinder of the hard disk 52 at the sector "2N" and the center of the track of the above cylinder is smaller than the reference value. When the error is detected as being greater than the reference value, it is determined that the location indicated by the location data of the sector "2N+1" is defective. Otherwise, the location indicated by the location data of the sector "2N+1" is determined as being correct. After the step S34 is performed, the procedure is transferred to the above step S29.

Further, when the result at the step S28 is affirmative (i.e., the flag "i"=1), step S35 is performed. Step S35 skips the location data on the sector "2N" of the hard disk 52, and detects whether the R/W head 44 is on-track at a cylinder indicated by the previous location data when an on-track operation of the R/W head 44 is performed.

When the result at the above S35 is negative, the above defect location detecting procedure is finished as the abnormal end at the step S33.

When the result at the above step S35 is affirmative, step S36 is performed. Step S36 checks that the error between the on-track position of the R/W head 44 on the cylinder of the hard disk 52 at the sector "2N+1" and the center of the track of the above cylinder is smaller than the reference value. When the error is detected as being greater than the reference value, it is determined that the location indicated by the location data of the sector "2N" is defective. Otherwise, the location indicated by the location data of the sector "2N" is determined as being correct. After the step S36 is performed, the procedure is transferred to the above step S29.

Further, when the result at the step S29 is affirmative, it is determined that the defect-location detection for all the cylinders of the hard disk 52 is completed, and step S37 is performed. Step S37 stores all the results of the above defect-location detection in a memory. The above defect location detecting procedure is finished as the normal end at step S38. The above defect-location detecting procedure is carried out for each of all the recording disks of the hard disk 52.

In the above embodiment of FIG. 7, the on-track checking and the defect-location detection with respect to the even-number sector and the odd-number sector of each cylinder are performed. In a further embodiment of the present invention, the on-track checking and the defect-location detection with respect to each of two adjacent consecutive sectors of each cylinder may be alternatively performed.

Figure 8A:
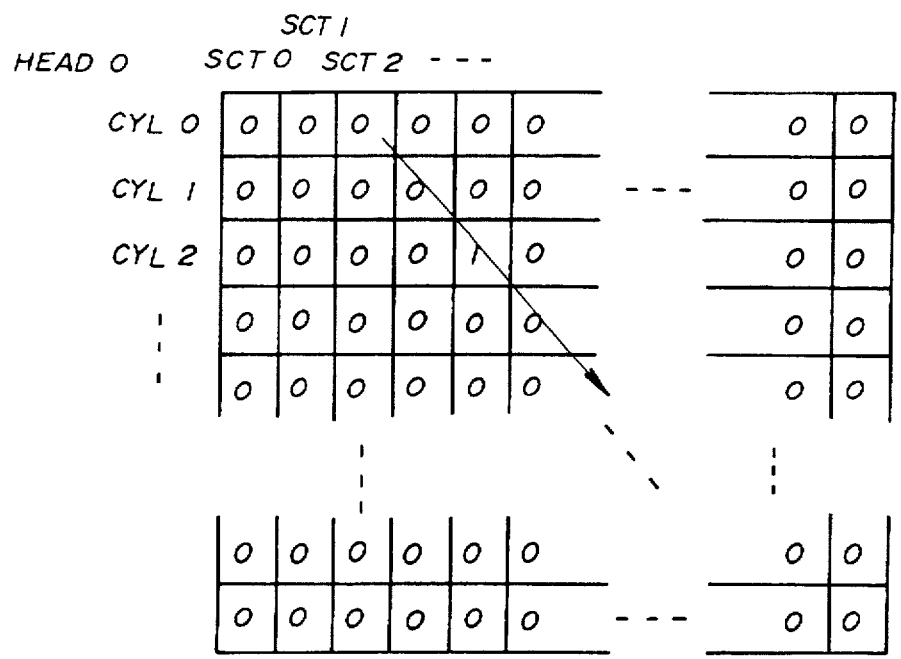
FIGS. 8A and 8B are diagrams for explaining defect location data which is stored within the disk apparatus of the present embodiment.
Figure 8B:
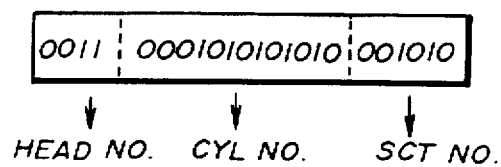

FIGS. 8A and 8B show the defect location data which is stored within the disk apparatus of the present embodiment. Different forms of the defect location data are shown in FIGS. 8A and 8B.

Referring to FIG. 8A, a table of the defect location data corresponding to the location data of all the sectors on each cylinder of the hard disk 52 with respect to each of the R/W heads 44 is produced as the result of the defect location detection procedure shown in either FIG. 6 or FIG. 7. In this table, as shown in FIG. 8A, when the location data of a specific sector "SCT n" of one cylinder "CYL n" of the hard disk 52 is normal, a corresponding data piece of the table is indicated by the value "zero", and, when the location data of the specific sector "SCT n" of one cylinder "CYL n" of the hard disk 52 is a defect, a corresponding data piece of the table is indicated by the value "1". In addition, a plurality of tables respectively corresponding to the plurality of the R/W heads 44 are produced.

The location data including the defect location data of the first form, as shown in FIG. 8A, is stored in the ROM 39 of the MPU 36. Alternatively, the above location data may be stored in a reserved region of the outermost cylinder (or the innermost cylinder) of the hard disk 52.

Referring to FIG. 8B, the defect location data in another form which is different from the form of the defect location data in FIG. 8A is shown. The defect location data of the form in FIG. 8B consists of data pieces of a head number, data pieces of a cylinder number, and data pieces of a sector number, which are related to a specific defect location of the hard disk 52. In the example of the defect location data in FIG. 8B, the head number "HEAD NO." included in the defect location data is represented by four bits of head number data, the cylinder number "CYL NO." included therein is represented by 13 bits of cylinder number data, and the sector number "SCT NO." included therein is represented by 6 bits of sector number data. A location of the hard disk 52 whose location data is a defect is indicated by the defect location data of the secondary form.

The defect location data of the secondary form, as shown in FIG. 8B, is stored in the ROM 39 of the MPU 36. Alternatively, the above defect location data may be stored in the reserved region of the outermost cylinder (or the innermost cylinder) of the hard disk 52.

Alternatively, in a further embodiment of the defect location data, data indicative of the presence of the defect location data may be stored at the servo frame portion 52a of a sector of a corresponding cylinder of the hard disk 52.

Figure 9:
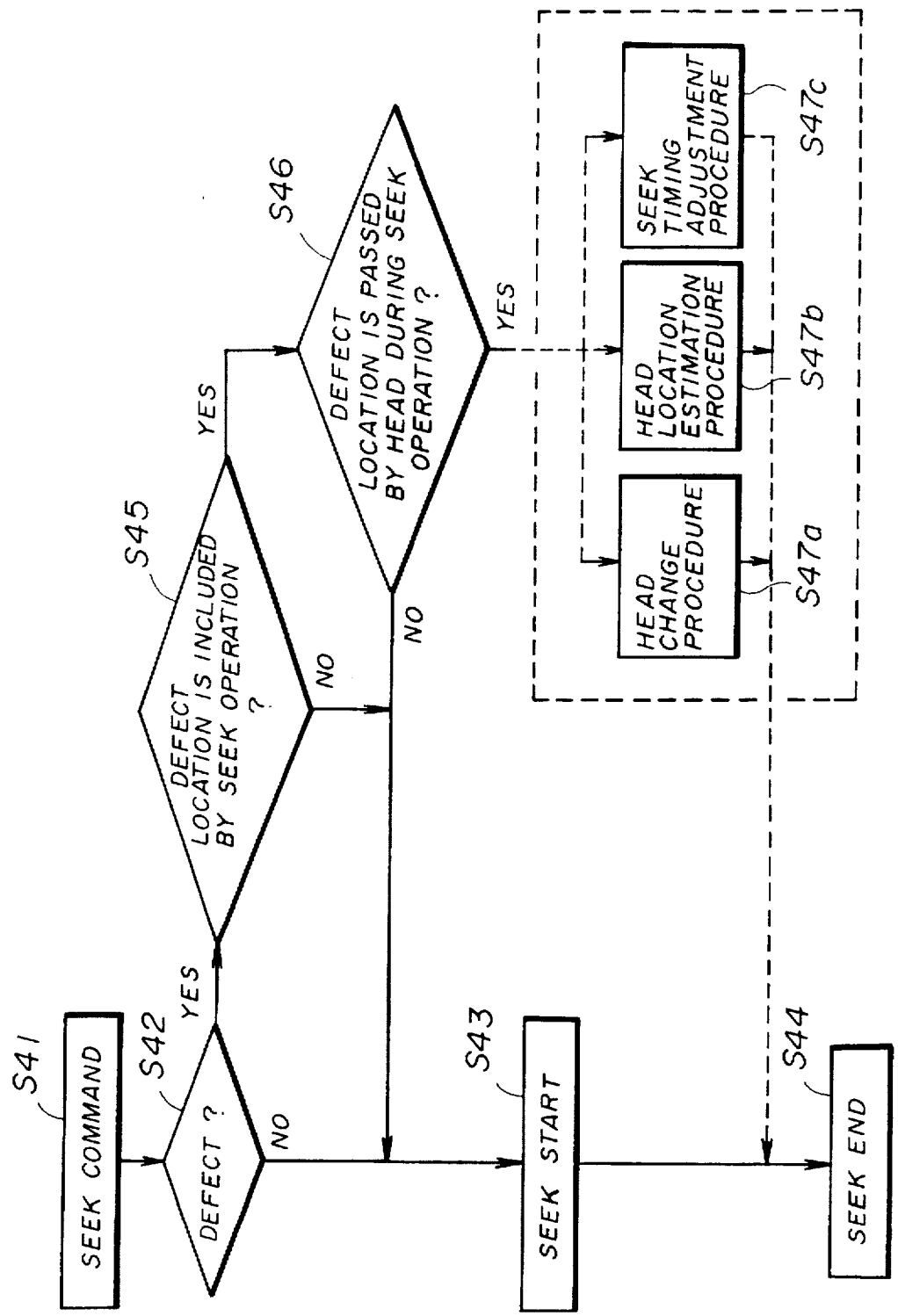
FIG. 9 is a flowchart for explaining a seek operation of a head which is performed based on the defect location data in FIG. 8A.

FIG. 9 shows a seek operation of a head of the disk apparatus, which is performed by the MPU 36 based on the defect location data shown in FIG. 8A.

In a case of the seek operation of the head shown in FIG. 9, it is supposed that the defect location data of the first form (the table shown in FIG. 8A) is stored in the ROM 39 of the MPU 36 in the disk apparatus 31 shown in FIG. 2.

Referring to FIG. 9, step S41 inputs a seek command from the host computer 32. Step S42 reads out the location data of the table from the ROM 39 in accordance with the seek command, and detects whether the location data at a target position of the hard disk 52 accessed by one of the R/W heads 44 which is selected by the seek command, is a defect by making reference to the table of the ROM 39.

When the result at the step S42 is negative, it is determined that the location data at the target position of the hard disk 52 is correct (not a defect), and step S43 is performed. Step S43 starts a seek operation of the selected R/W head 44. This seek operation is performed by the seek control unit 38 of the MPU 36 in accordance with location data read from the ROM 39. An on-track operation of the R/W head 44 is performed to locate the target cylinder of the hard disk 52, and a follow-up operation of the R/W head 44 is performed to avoid the off-track location of the head. After these operations are performed at the step S43, step S44 finishes the seek operation of the R/W head 44 as the normal end.

When the result at the step S42 is affirmative, it is determined that the location data at the target position of the hard disk 52 is a defect, and step S45 is performed. Step S45 determines a seek path of the selected R/W head 44 from the present position to the target position on the hard disk 52 by making reference to the table of the ROM 39, and detects whether the "defect" cylinder of the hard disk 52 at which the defect location data is stored is included by the seek path of the selected R/W head 44. The determination is performed by the defect location determining unit 37 of the MPU 36.

When the result at the step S45 is negative, it is determined that the "defect" cylinder is not included by the seek path of the selected R/W head 44. The procedure is transferred to the above step S43 so that the seek operation of the selected R/W head 44 is normally performed by the seek control unit 38.

When the result at the step S45 is affirmative, it is determined that the "defect" cylinder is included by the seek path of the selected R/W head 44. Step S46 detects whether the defect location is passed by the selected R/W head 44 during the seek operation, in accordance with a distance from the present position of the selected R/W head 44 to the target position, a seek direction, and a rotation speed of the hard disk 52. This determination is carried out by the defect location determining unit 37 by making reference to the table of the ROM 39.

When the result at the step S46 is negative, it is determined that the defect location is not passed by the selected R/W head 44. The procedure is transferred to the above step S43 so that the seek operation of the selected R/W head 44 is normally performed by the seek control unit 38.

On the other hand, when the result at the step S46 is affirmative, it is determined that the defect location is passed by the selected R/W head 44. One of three steps S47a, S47b and S47c is selected and performed by the seek control unit 38 so that the seek operation of the selected R/W head 44 is normally performed without causing a seek error to occur even when the location data of the hard disk 52 includes a defect.

Herein, the step S47a shown in FIG. 9 is called the head change procedure, the step S47b is called the head location estimation procedure, and the step S47c is called the seek timing adjustment procedure.

After the selected one of the above-mentioned procedures is performed, the procedure is transferred to the above step S44, and the above step S43 is not performed.

Figure 10:
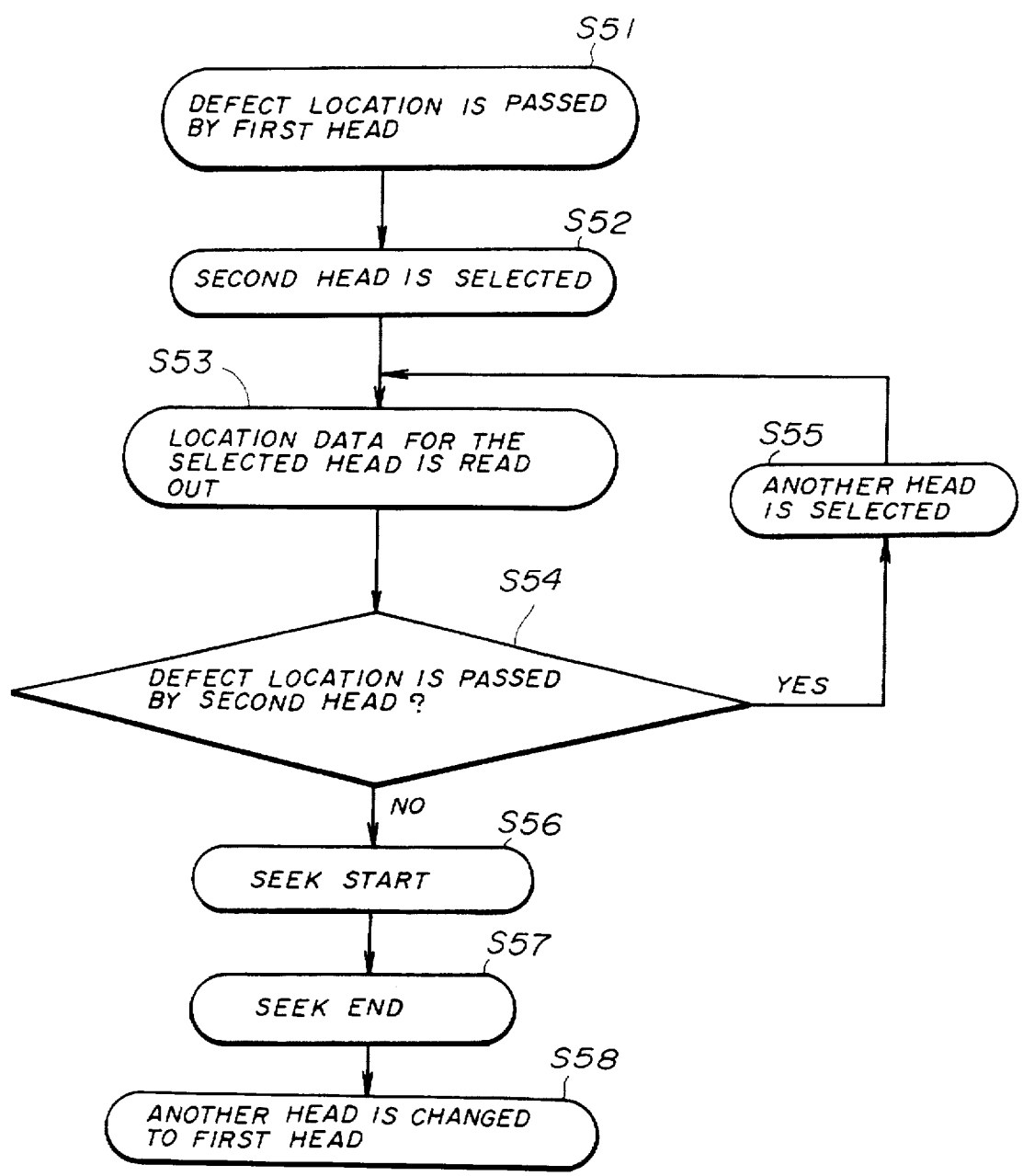
FIG. 10 is a flowchart for explaining a head change procedure of the seek operation in FIG. 9.

FIG. 10 shows the head change procedure of the seek operation in FIG. 9. The head change procedure in FIG. 10 corresponds to the step S47a of the seek operation in FIG. 9. The head change procedure in FIG. 10 is executed by the MPU 36 including the defect location determining unit 37 and the seek control unit 38.

Referring to FIG. 10, step S51 detects that the defect location is passed by the selected R/W head 44 (identified by a head number "N") during the seek operation. This detection is performed by the defect location determining unit 37.

After the step S51 is performed, step S52 selects a second R/W head 44, which is different from the selected R/W head 44 "N", from among the R/W heads 44 of the disk apparatus 31. This selection is performed by the seek control unit 38. A notification of a head number identifying the selected second R/W head 44 is sent by the seek control unit 38 to the defect location determining unit 37.

Step S53 reads out the location data of the table (shown in FIG. 8A) of the ROM 39 for the selected second R/W head 44, and determines a seek path of the selected second R/W head 44 from the present position to the target position by making reference to the table of the ROM 39. The determination is performed by the defect location determining unit 37.

Step S54 detects whether the "defect" cylinder of the hard disk 52 is included by the seek path of the selected second R/W head 44. Also, the step S54 detects whether the defect location is passed by the selected second R/W head 44 during the seek operation. The detection is performed by the defect location determining unit 37.

When the result at the step S54 is affirmative, it is determined that the defect location is included in the seek path and that the defect location is passed by the second R/W head 44 during the seek operation, and step S55 is performed. A notification of the result of the detection is sent by the defect location determining unit 37 to the seek control unit 38. Step S55 selects another R/W head 44, which is different from the second R/W head 44 and the first R/W head 44 "N", from among the R/W heads 44 of the disk apparatus 31.

After the step S55 is performed, the above steps S53 and S54 are repeated until the result at the step S54 becomes negative.

When it is determined at the step S54 that the defect location is not included in the seek path and not passed by the selected R/W head 44, step S56 is performed. The selected R/W head 44 at this time may be the second R/W head 44 or another R/W head 44, and it will be referred to as the another R/W head 44. Step S56 starts a seek operation of the another R/W head 44. This seek operation is normally performed by the seek control unit 38. An on-track operation of the another R/W head 44 is performed to locate the target cylinder of the hard disk 52, and a follow-up operation of the another R/W head 44 is also performed to avoid the off-track location of the head.

After the above step S56 is performed, step S57 finishes the seek operation of the another R/W head 44 as the normal end.

After the above step S57 is performed, step S58 changes the another R/W head 44 to the first R/W head 44 "N" so that the first R/W head 44 "N" is selected. The operations of the steps S56, S57 and S58 are performed by the seek control unit 38.

Figure 11:
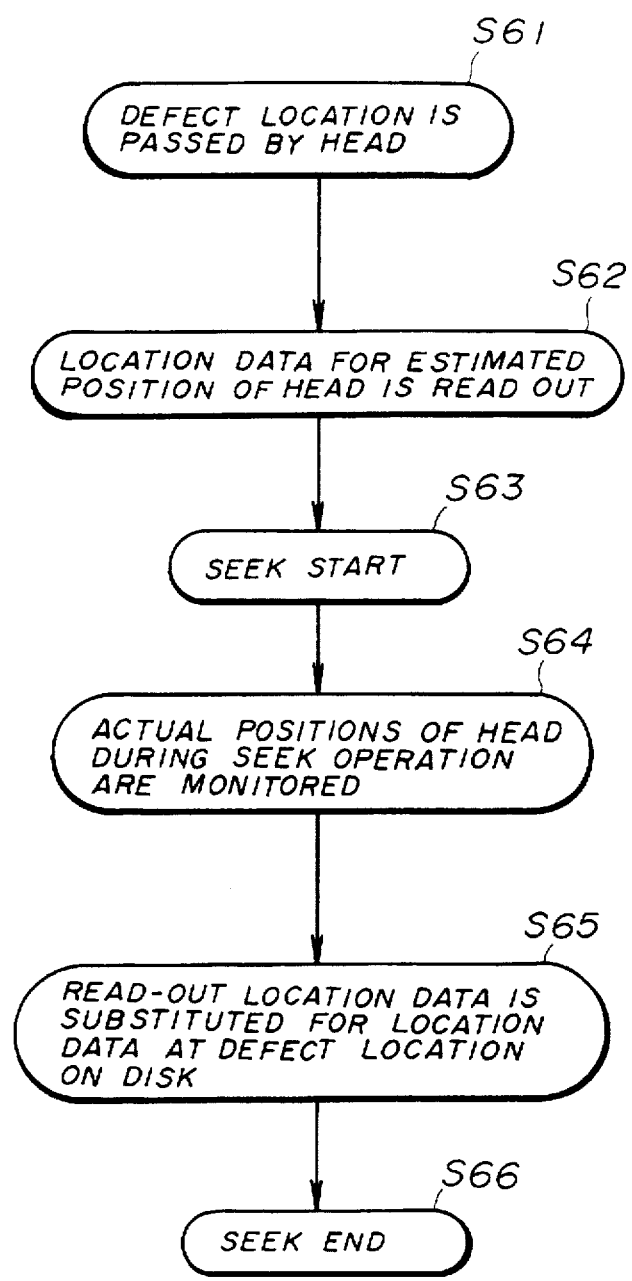
FIG. 11 is a flowchart for explaining a head location estimation procedure of the seek operation in FIG. 9.

FIG. 11 shows the head location estimation procedure of the seek operation in FIG. 9. The head location estimation procedure in FIG. 11 corresponds to the step S47b of the seek operation in FIG. 9. The procedure in FIG. 11 is executed by the MPU 36 including the defect location determining unit 37 and the seek control unit 38.

Referring to FIG. 11, step S61 detects that the defect location is passed by the selected R/W head 44 during the seek operation. This detection is performed by the defect location determining unit 37.

Step S62 determines an estimated position of the selected R/W head 44 at the defect location from the present position of the head 44 and the present moving speed of the head 44, and reads out the location data of the table of the ROM 39 for the estimated position of the head 44. The determination is performed by the defect location determining unit 37.

Step S63 starts a seek operation of the selected R/W head 44. The seek operation of the head 44 is performed by the seek control unit 38 by using the read-out location data for the estimated position. An on-track operation of the head 44 is performed to locate the target cylinder of the hard disk 52, and a follow-up operation of the head 44 is performed to avoid the off-track location of the head 44.

Step S64 monitors the actual positions of the selected R/W head 44 by reading out the location data from the corresponding one of the recording disks of the hard disk 52 during the seek operation.

Step S65 substitutes the read-out location data of the estimated position of the head 44 for the location data at the defect location on the hard disk 52 when the head 44 is at the estimated position on the hard disk 52 during the seek operation.

After the step S65 is performed, step S66 finishes the seek operation of the selected R/W head 44 as the normal end when the head 44 is on-track at the target cylinder of the hard disk 52. The operations of the steps S63 through S66 are performed by the seek control unit 38.

In the above head location estimation procedure, the read-out defect location data is used instead of the defect location data when the seek operation of the head is performed. It is possible that the seek operation of the read/write head 44 to the target location on the hard disk 52 is performed without causing a seek error to occur even when the location data of the hard disk 52 includes a defect.

Figure 12:
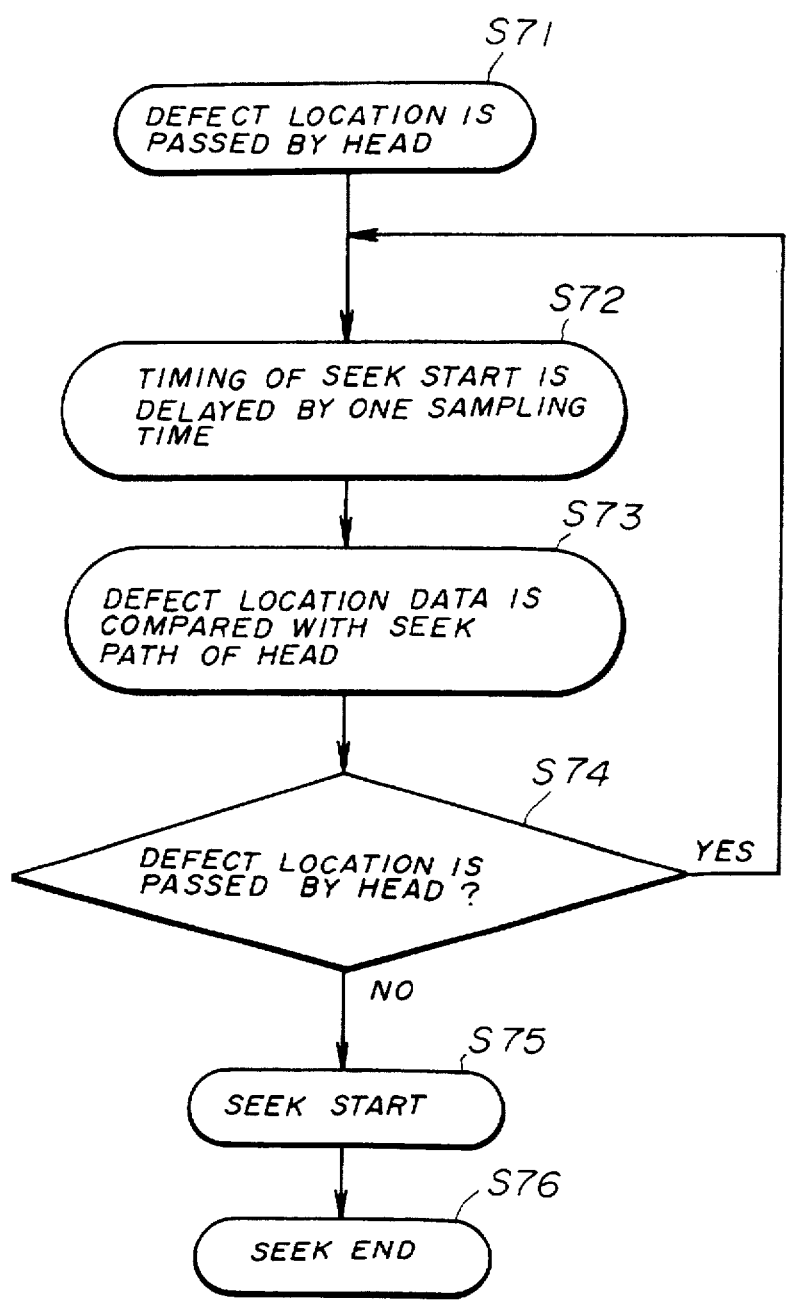
FIG. 12 is a flowchart for explaining a seek timing adjustment procedure of the seek operation in FIG. 9.

FIG. 12 shows the seek timing adjustment procedure of the seek operation in FIG. 9. The seek timing adjustment procedure in FIG. 12 corresponds to the step S47c of the procedure in FIG. 9. The procedure in FIG. 12 is executed by the MPU 36 including the defect location determining unit 37 and the seek control unit 38.

Referring to FIG. 12, step S71 detects that the defect location is passed by the selected R/W head 44 during the seek operation. This detection is performed by the defect location determining unit 37.

Step S72 delays the timing to start the seek operation of the selected R/W head 44 by the seek control unit 38 by a duration of one sampling time. The delaying is performed by the seek control unit 38.

After the delaying is performed at the step S72, step S73 determines a seek path of the selected R/W head 44 from the present position to the target position by making reference to the table of the ROM 39 (shown in FIG. 8A), and compares the defect location data with the seek path of the selected R/W head 44.

After the step S73 is performed, step S74 detects whether the defect location is still passed by the selected R/W head 44 after the seek timing is delayed by the duration of one sampling time.

When the result at the step S74 is affirmative, the above steps S72 and S73 are repeated until it is detected that the defect location is not passed by the selected R/W head 44.

When the result at the step S74 is negative, it is determined that the defect location is not passed by the selected R/W head 44, and step S75 is performed. Step S75 starts a seek operation of the selected R/W head 44 after the delaying of the seek timing is performed at the steps S72 and S73.

After the above step S75 is performed, step S76 finishes the seek operation of the selected R/W head 44 as the normal end when the head 44 is on-track at the target cylinder of the hard disk 52. Therefore, the selected R/W head 44 is prevented from passing the defect location on the hard disk 52 during the seek operation even when the location data of the hard disk 52 includes a defect.

Since one of the procedures shown in FIGS. 10, 11 and 12 is selected and performed by the MPU 36 including the defect location determining unit 37 and the seek control unit 38, it is possible for the disk apparatus 31 of the present invention to normally carry out the seek operation of the read/write head 44 without causing a seek error to occur even when the location data of the hard disk 52 includes a defect.

Figure 13:
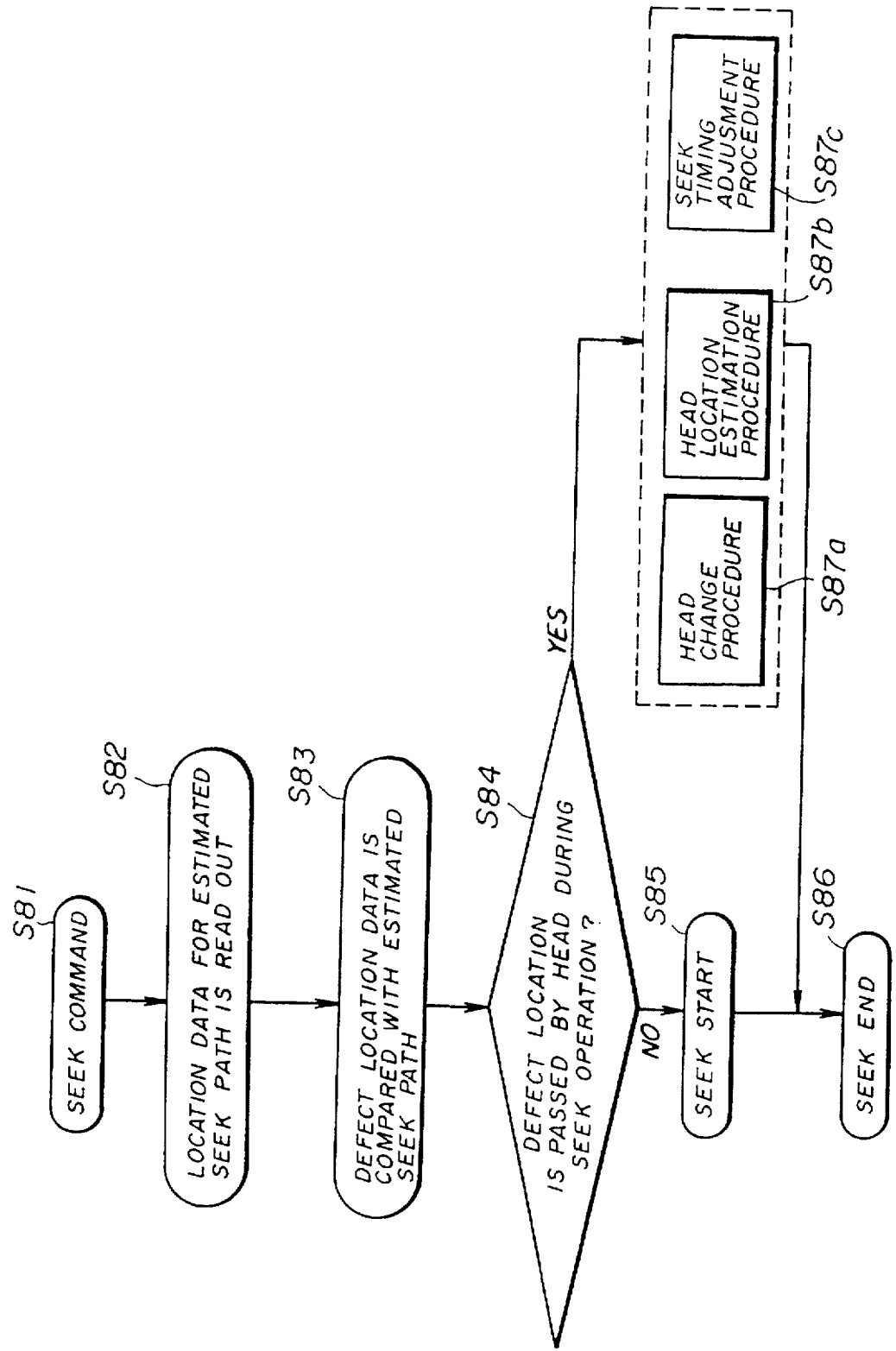
FIG. 13 is a flowchart for explaining a seek operation of a head which is performed based on the stored defect location data in FIG. 8B.

FIG. 13 shows a seek operation of a head of the disk apparatus 31, which is performed based on the stored defect location data in FIG. 8B.

In the present embodiment, only the defect location data shown in FIG. 8B is stored within the disk apparatus 31. It is necessary for the defect location determining unit 37 to determine an estimated seek path of the R/W head 44 from the present position to the target position on the hard disk 52 during the seek operation. This is different from the seek operation procedure of the previous embodiment in FIG. 9.

In the present embodiment, a number of sampling points of an estimated seek path on the hard disk 52 are predetermined, and the estimated seek path of the R/W head 44 is determined by calculating a set of a cylinder value and a sector value of each of the predetermined sampling points.

For example, 60 sampling points on the hard disk 52 are predetermined, and an estimated seek path of the R/W head 44 is determined by calculating a set of a cylinder value and a sector value of each of those sampling points. The calculated cylinder value of each sampling point indicates a value in the range of cylinder numbers CYL 0—CYL 100, and the calculated sector value of each sampling point indicates a value in the range of sector numbers SCT 1—SCT 60.

The calculation of the cylinder value and the sector value of each of the predetermined sampling points is carried out based on the quantity of electric current applied to the VCM 48. The quantity of the applied current is indicative of an acceleration of the R/W head 44. By obtaining a moving speed and a position of the R/W head 44 from differentials of the acceleration indicated by the applied current, the cylinder value and the sector value of each of the sampling points are calculated. An estimated seek path of the R/W head 44 is determined based on the sets of the calculated cylinder values and sector values of the sampling points.

Figures 14A, 14B:
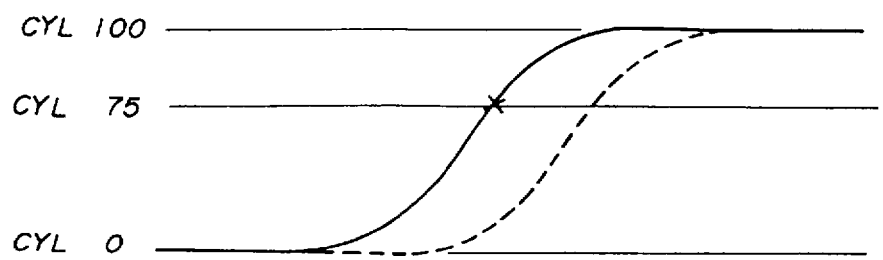
FIGS. 14A and 14B are diagrams for explaining the seek operation in FIG. 13.

A table defining the sets of the calculated cylinder values and sector values for the 60 sampling points in the above example is as shown in FIG. 14A. This table is stored in, for example, the ROM 39 of the disk apparatus 31. Alternatively, the table shown in FIG. 14A may be stored in a reserved region of the hard disk 52.

A locus of the estimated seek path which is determined in the above example based on the calculated cylinder values and sector values of the sampling points is as indicated by a solid line in FIG. 14B.

Referring to FIG. 13, step S81 inputs a seek command from the host computer 32. Step S82 reads out the estimated seek path data of the table (as shown in FIG. 14A) from the ROM 39, and determines the estimated seek path of the R/W head 44, selected by the seek command, by making reference to the table of the ROM 39.

After the estimated seek path of the R/W head 44 is determined at the step S82, step S83 reads from the ROM 39 the defect location data (as shown in FIG. 8B) for a location of the hard disk 52 accessed by the R/W head 44, and compares the defect location data with the data of the estimated seek path of the R/W head 44.

After the step S83 is performed, step S84 detects whether the defect location is passed by the R/W head 44 during the seek operation, by making reference to the stored data of the ROM 39.

The operations of the steps S81 through S84 are performed by the defect location determining unit 37.

When the result at the step S84 is negative, it is determined that the defect location is not passed by the R/W head 44. Step S85 starts a seek operation of the R/W head 44. This seek operation is performed by the seek control unit 38. An on-track operation of the R/W head 44 is performed to locate the target cylinder of the hard disk 52, and a follow-up operation of the R/W head 44 is performed to avoid the off-track location of the head. After the step S85 is performed, step S86 finishes the seek operation of the R/W head 44 as the normal end.

On the other hand, when the result at the step S84 is affirmative, it is determined that the defect location is passed by the R/W head 44 during the seek operation. Similarly to the seek operation procedure of the previous embodiment in FIG. 9, one of three steps S87a, S87b and S87c is selected and performed by the seek control unit 38, so that the seek operation of the R/W head 44 is normally performed without causing a seek error to occur even when the location data of the hard disk 52 includes a defect.

Similarly to the previous embodiment of FIG. 9, the step S87a in FIG. 13 corresponds the head change procedure which is shown in FIG. 10, the step S87b in FIG. 13 corresponds to the head location estimation procedure which is shown in FIG. 11, and the step S87c in FIG. 13 corresponds to the seek timing adjustment procedure which is shown in FIG. 12.

After the selected one of the above-mentioned procedures is performed, the procedure is transferred to the above step S86 and the above step S85 is not performed.

In the above example in FIG. 14B, the defect location is at the cylinder "CYL 75" of the hard disk 52 and passed by the estimated seek path of the head 44. The defect location in the above example is as indicated by an "X" in FIG. 14B.

When the result at the step S84 is affirmative, for example, the seek timing adjustment procedure (the step S87c) is selected and performed by the seek control unit 38. Since the timing to start the seek operation of the head 44 is delayed when the seek timing adjustment procedure is performed, the seek path of the R/W head 44 is changed to a seek path indicated by a dotted line in FIG. 14B due to the rotation of the hard disk 52. This makes it possible that the defect location is not passed by the R/W head 44 during the seek operation.

Further, the present invention is not limited to the above-described embodiments, and variations and modifications may be made without departing from the scope of the present invention.

As described above, even when the location data of the magnetic disks of the hard disk 52 includes a defect, the disk apparatus 31 of the present invention detects the location of the defect on the hard disk 52, and detects whether the defect location is included by a seek path of the read/write head from the present position to the target position, and detects whether the defect location is passed by the head during its seek operation. When the defect location is passed by the head, accessing the location data at the location of the defect on the hard disk 52 is avoided, and the seek operation is performed while selecting an appropriate one of the head change procedure, the head location estimation procedure and the seek timing adjustment procedure.

According to the present invention, it is possible to control the seek operation of the read/write head without causing a seek error to occur when the location data of the hard disk includes a defect. Since it is not necessary to provide an additional control circuit for the disk apparatus, the method and apparatus of the present invention can provide the above-mentioned control of the seek operation with a low cost. Also, it is not necessary to use a high-precision recording medium for the disk apparatus, and it is possible to ensure high reliability of a seek operation of the disk apparatus with a low cost. Further, even when the location data of the hard disk includes a defect, neither the re-formatting of the hard disk nor the scrapping of the same is required. Therefore, the present invention provides a high cost performance for the disk apparatus.

Japanese Laid-Open Patent Application No. 59-63065 discloses a magnetic disk device in which a location of a defect on a magnetic disk is pre-recorded as the defect location data. Japanese Laid-Open Patent Application No.63-237270 discloses a magnetic disk device of a similar type. In the above-mentioned disk devices, when a location of a servo head indicated by a position signal read out during a seek operation of the servo head is detected to accord with the location indicated by the defect location data, the position signal is not selected for the seek operation. When the head location indicated by the position signal is detected to differ from the defect location indicated by the defect location data, the position signal is selected for the seek operation.

However, the above-mentioned publications do not teach determining an estimated seek path of a read/write head during its seek operation or detecting whether the location of a defect on the magnetic disk is passed by the read/write head during the seek operation, as in the present invention.

Japanese Laid-Open Patent Application No.63-167488 discloses a magnetic disk device in which a seek operation of a read/write head is performed by changing the read/write head to another read/write head. In the above-mentioned disk device, when an error of a servo track on one of recording surfaces of magnetic disks occurs during the seek operation of a first read/write head, the seek operation of a second read/write head, different from the first read/write head, is performed by accessing a servo track on another recording surface.

However, the above publication fails to teach determining an estimated seek path of the read/write head prior to performing the seek operation, and fails to teach detecting whether the location of a defect on the magnetic disk is passed by the read/write head during the seek operation.

Japanese Laid-Open Patent Application No.64-57465 discloses a magnetic disk device in which the timing to start a seek operation of a head is delayed. In the above-mentioned disk device, a location of a defect on a magnetic disk is pre-recorded as the defect location data. In order to detect whether a location of the head indicated by a position signal accords with the location indicated by the defect location data, it is necessary for the above disk device to include an additional control circuit including a register, a gate and a comparator.

However, the above publication fails to teach determining an estimated seek path of the head and fails to teach detecting whether the location of a defect on the magnetic disk is passed by the head during the seek operation, without using an additional control circuit, as in the present invention.

Japanese Laid-Open Patent Application No.63-26814 discloses a magnetic disk device in which performing a seek operation of a head based on servo data on a data region of the magnetic disk is inhibited when the servo data on the data region is detected as an error. In the above-mentioned disk device, a first seek operation of the head based on servo data a servo region of the magnetic disk is performed, and a second seek operation of the head based on the servo data on the data region is further performed to accurately locate the head at a target position on the magnetic disk. In order to detect an error of the servo data on the data region, the above disk device requires a special control circuit provided therein.

However, the above publication does not teach determining an estimated seek path of the head or detecting whether the location of the defect on the magnetic disk is passed by the head during the seek operation, without using an additional control circuit, as in the present invention.

What is claimed is:

1. A disk apparatus in which a seek operation of one of a plurality of heads to a target position on one of a plurality of recording disks is performed by using location data on the one of the recording disks, said disk apparatus comprising:

a memory unit in which at least defect location data is stored, said defect location data indicating a location of a defect on the recording disks;

a defect location determining unit determining a seek path of the one of the heads from a present position to the target position prior to performing the seek operation, and detecting whether said defect location, indicated by said defect location data read from aid memory unit, is included in said seek path; and a seek control unit performing the seek operation of the one of the heads by using the location data on the one of the recording disks, except when said defect location determining unit detects that said defect location is included in said seek path.

2. The disk apparatus according to claim 1, wherein said memory unit stores a table of the defect location data corresponding to the location data of all sectors on each of cylinders of the recording disks with respect to each of the heads.

3. The disk apparatus according to claim 1, wherein said memory unit stores only the defect location data which indicates the location of the defect on the recording disks.

4. The disk apparatus according to claim 1, wherein said memory unit is one of a predetermined region of a corresponding one of the recording disks and a memory of a microprocessor unit.

5. The disk apparatus according to claim 1, wherein said defect location determining unit performs a determination on whether said defect location indicated by said defect location data is passed by the one of the heads during the seek operation, in accordance with a distance from the present position of the head to the target position, a seek direction, and a rotation speed of the recording disks.

6. The disk apparatus according to claim 1, wherein, when it is detected that said defect location is passed by said one of the heads during the seek operation and that said defect location is not passed by a second one of the heads during the seek operation, said seek control unit performs the seek operation of the second head by using location data on a second one of the recording disks, and changes from the second head back to the one of the heads after the seek operation of the second head.

7. The disk apparatus according to claim 1, wherein, when it is detected that said defect location is passed by said one of the heads during the seek operation, said seek control unit performs the seek operation of said one of the heads by substituting location data read out for an estimated position of said one of the heads for the location data on said one of the recording disks.

8. The disk apparatus according to claim 1, wherein, when it is detected that said defect location is passed by said one of the heads during the seek operation, said seek control unit delays a timing to start the seek operation of said one of the heads such that said defect location is passed by said one of the heads when said timing is delayed.

9. A method of detecting a location of a defect on a plurality of recording disks to perform a seek operation of one of a plurality of heads to a target position on one of the recording disks by using location data on the one of the recording disks, said method comprising the steps of:

detecting in a first detecting step whether one of the heads is on-track at a selected position of the recording disks when an on-track operation of said one of the heads is performed by using location data on a corresponding one of the recording disks;

detecting in a second detecting step whether an error between a location, indicated by location data read by a second head from the recording disks, and the center of an on-track position of said one of the heads is smaller than a reference value when said second head is detected as being off-track at said selected position;

repeating said first and said second detecting steps for all the heads to detect whether the error with respect to each of the heads is smaller than the reference value, so that at least defect location data indicating a location of each defect on the recording disks is produced as a result of said detection; and storing said defect location data.

10. A method of detecting a location of a defect on a plurality of recording disks to perform a seek operation of one of a plurality of heads to a target position on one of the recording disks by using location data on the one of the recording disks, said method comprising the steps of:

detecting in a first detecting step whether one of the heads is on-track at a location indicated by location data on a selected sector of one of the recording disks when an on-track operation of the one of the heads is performed by using the location data on the selected sector;

detecting in a second detecting step whether an error between a location, indicated by location data on a second selected sector of the one of the recording disks, and the center of an on-track position of the one of the heads is smaller than a reference value;

detecting in a third detecting step whether an error between a location, indicated by the location data on the selected sector of the one of the recording disks, and the center of an on-track position of the one of the heads based on the location data on the second selected sector is smaller than the reference value;

repeating said first, said second and said third detecting steps for all the heads to detect whether the error with respect to each of the heads is not smaller than the reference value, so that at least defect location data indicating a location of each defect on the recording disks is produced as a result of said detection; and storing said defect location data.

11. A method of controlling a seek operation of one of a plurality of heads to a target position on one of a plurality of recording disks of a disk apparatus by using location data on the one of the recording disks, said method comprising the steps of:

storing at least defect location data in a memory, said defect location data indicating a location of each defect on the recording disks;

determining a seek path of the one of the heads from a present position to the target position prior to performing the seek operation;

detecting whether said defect location, indicated by said defect location data read from said memory, is included in said seek path;

performing the seek operation of the one of the heads by using the location data on the one of the recording disks; and not using the location data at said defect location when it is detected that said defect location is included by said seek path.

12. The method according to claim 11, wherein said method further comprises the steps of:

performing the seek operation of a second head by using location data on a second of the recording disks, when it is detected that said defect location is passed by said one of the heads during the seek operation and that a second defect location is not passed by the second head during the seek operation; and changing from the second head back to the one of the heads after the seek operation of the second head is performed.

13. The method according to claim 11, wherein said method further comprises a step of:

substituting location data read out for an estimated position of said one of the heads for the location data on said one of the recording disks, when it is detected that said defect location is passed by said one of the heads during the seek operation.

14. The method according to claim 11, wherein said method further comprises a step of:

delaying a timing to start the seek operation of said one of the heads such that said defect location is passed by said one of the heads when said timing is delayed, when it is detected that said defect location is passed by said one of the heads during the seek operation.

* * * * *